(12) United States Patent
Gorokhov et al.

(10) Patent No.: US 7,230,990 B2
(45) Date of Patent: Jun. 12, 2007

(54) MULTICARRIER TRANSMISSION SYSTEM WITH REDUCED COMPLEXITY CHANNEL RESPONSE ESTIMATION

(75) Inventors: Alexei Gorokhov, Eindhoven (NL); Johan Paul Marie Gerard Linnartz, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 655 days.

(21) Appl. No.: 10/078,932

(22) Filed: Feb. 19, 2002

(65) Prior Publication Data

US 2002/0146078 A1  Oct. 10, 2002

(30) Foreign Application Priority Data

Feb. 22, 2001  (EP) .................. 01200687

(51) Int. Cl.
*H04L 27/28* (2006.01)
*H04K 1/00* (2006.01)

(52) U.S. Cl. ............ 375/260; 375/346; 375/148; 375/229

(58) Field of Classification Search ......... 375/148, 375/223, 229, 260, 316, 343, 346, 348, 350, 375/351; 455/296
See application file for complete search history.

(56) References Cited

U.S. PATENT DOCUMENTS

| | | | | |
|---|---|---|---|---|
| 5,802,117 | A * | 9/1998 | Ghosh ............... | 375/344 |
| 6,252,908 | B1 * | 6/2001 | Tore ................. | 375/259 |
| 6,456,654 | B1 * | 9/2002 | Ginesi et al. ...... | 375/229 |
| 6,526,103 | B1 * | 2/2003 | Li et al. ............ | 375/316 |
| 6,654,408 | B1 * | 11/2003 | Kadous et al. ..... | 375/148 |
| 6,714,520 | B1 * | 3/2004 | Okamura ........... | 370/286 |
| 6,724,809 | B2 * | 4/2004 | Reznik ............... | 375/148 |
| 6,765,969 | B1 * | 7/2004 | Vook et al. ........ | 375/259 |

FOREIGN PATENT DOCUMENTS

WO  WO0163870  2/2001

OTHER PUBLICATIONS

"Equalization of FFT-leakage in mobile DVB-T", Master Thesis in Radiocommunication from the Royal Institute of Technology, Stockholm, by Guillaume Geslin, Apr. 1998, pp. 1-59.
J-P M. G. Linnartz et al.; "Doppler-Resistent OFDM Receivers for Mobile Multimedia Communications", Proceedings of the International Symposium of Mobile Multimedia Systems and Applications, Nov. 9-10, 2000, pp. 87-92, XP001014332.

* cited by examiner

*Primary Examiner*—Emmanuel Bayard
*Assistant Examiner*—Lawrence Williams
(74) *Attorney, Agent, or Firm*—Larry Liberchuk

(57) ABSTRACT

Described is a transmission system for transmitting a multicarrier signal from a transmitter (10) to a receiver (20). The multicarrier signal comprises a plurality of subcarriers. The receiver (20) comprises a channel estimator (28) for estimating amplitudes of the subcarriers and for estimating time derivatives of the amplitudes. The receiver (20) further comprises an equalizer (24) for canceling intercarrier interference included in the received multicarrier signal in dependence on the estimated amplitudes and derivatives (29). The channel estimator (28) comprises a reduced complexity filter for deriving vectors of the estimated amplitudes and derivatives (29) from vectors of received symbols (23) and vectors of estimated symbols (27). The reduced complexity filter may be arranged for exploiting an amplitude correlation between the amplitudes of different subcarriers and/or for exploiting a derivative correlation between the derivatives of different subcarriers.

16 Claims, 2 Drawing Sheets

Figure 1:
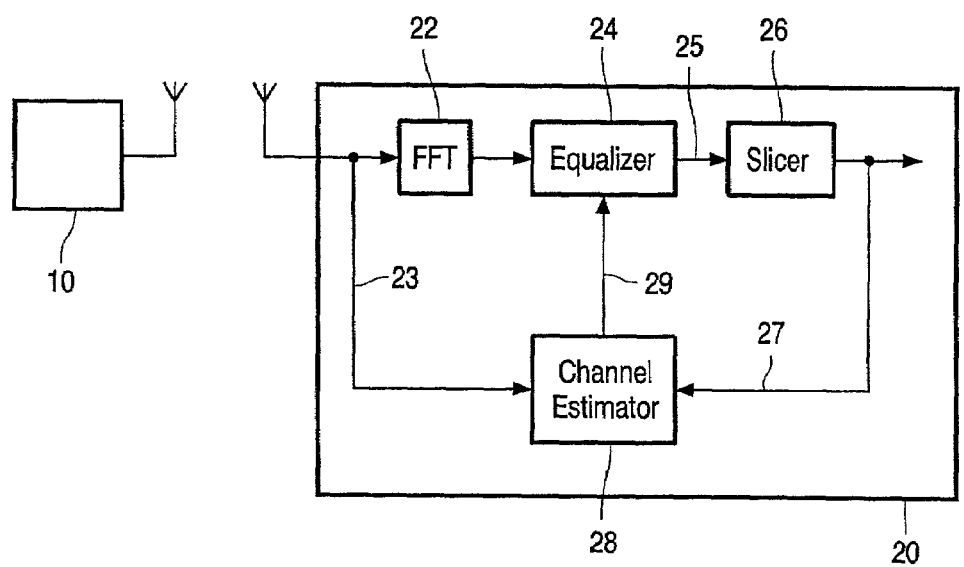

MULTICARRIER TRANSMISSION SYSTEM WITH REDUCED COMPLEXITY CHANNEL RESPONSE ESTIMATION

The invention relates to a transmission system for transmitting a multicarrier signal from a transmitter to a receiver.

The invention further relates to a receiver for receiving a multicarrier signal from a transmitter, a channel estimator for estimating amplitudes of subcarriers included in a multicarrier signal and for estimating time derivatives of the amplitudes, and to a method of estimating amplitudes of subcarriers included in a multicarrier signal and for estimating time derivatives of the amplitudes.

Multicarrier signal modulation methods, such as OFDM and MC-CDMA, have been around for some time now. OFDM or Orthogonal Frequency Division Multiplexing is a modulation method designed in the 1970's in which multiple user symbols are transmitted in parallel using different subcarriers. These subcarriers have overlapping (sinc-shaped) spectra, nonetheless the signal waveforms are orthogonal. Compared to modulation methods such as BPSK, QPSK or MSK, OFDM transmits symbols which have a relatively long time duration, but a narrow bandwidth. Mostly, OFDM systems are designed such that each subcarrier is small enough in bandwidth to experience frequency-flat fading. This also ensures that the subcarriers remain orthogonal when received over a (moderately) frequency selective but time-invariant channel. If the OFDM signal is received over such a channel, each subcarrier experiences a different attenuation, but no dispersion.

The above mentioned properties of OFDM avoid the need for a tapped delay line equalizer and have been a prime motivation to use OFDM modulation methods in several standards, such as Digital Audio Broadcasting (DAB), the Digital Terrestrial Television Broadcast (DTTB) which is part of the Digital Video Broadcasting standard (DVB), and more recently the wireless local area network standard HIPERLAN/2. Particularly in the DAB and DTTB applications, mobile reception under disadvantageous channel conditions are foreseen, with both frequency and time dispersion. Mobile reception of television has not been regarded as a major market up to now. Nonetheless, the DVB system promises to become a high-speed delivery mechanism for mobile multimedia and internet services. At the IFA '99 Consumer Electronics trade show, a consortium of Nokia, Deutsche Telecom and ZDF demonstrated mobile web browsing, email access and television viewing over an OFDM DVB link, with a GSM return channel. With 8 k OFDM subcarriers, over the air DVB reception functioned properly for vehicle speeds up to 50 mph. Mobile reception, i.e. reception over channels with Doppler spreads and the corresponding time dispersion remains one of the problems associated with OFDM systems in particular and multicarrier transmission systems in general. Whereas its robustness against frequency selectivity is seen as an advantage of OFDM, the time-varying character of the channel is known to limit the system performance. Time variations are known to corrupt the orthogonality of the OFDM subcarrier waveforms. In such a case, Intercarrier Interference (ICI, also referred to as interchannel interference or FFT leakage) occurs because signal components from one subcarrier cause interference to other, mostly neighboring, subcarriers.

In the document "Equalization of FFT-leakage in mobile DVB-T", Master Thesis in Radiocommunication from the Royal Institute of Technology, Stockholm, by Guillaume Geslin, April 1998, a multicarrier transmission system is disclosed. In this known transmission system ICI is cancelled (i.e. detected and removed from the received multicarrier signal) in the receiver by means of an equalizer. This equalizer derives a vector of estimated symbols from a vector of received symbols. The operation of the equalizer is based upon a channel model in which the amplitudes of the subcarriers and the time derivatives thereof are indicative of the ICI. The receiver comprises a channel estimator which generates estimates of these amplitudes and derivatives and supplies these estimates to the equalizer. The equalizer then cancels the ICI in dependence on the estimates of the amplitudes and derivatives. The channel estimator in the known transmission system is relatively complex, i.e. a relatively large number of computations is needed to implement the channel estimator.

It is an object of the invention to provide a transmission system according to the preamble in which the computational burden is substantially reduced. This object is achieved in the transmission system according to the invention, said transmission system being arranged for transmitting a multicarrier signal from a transmitter to a receiver, the multicarrier signal comprising a plurality of subcarriers, the receiver comprising a channel estimator for estimating amplitudes of the subcarriers and for estimating time derivatives of the amplitudes, the receiver further comprising an equalizer for canceling intercarrier interference included in the received multicarrier signal in dependence on the estimated amplitudes and derivatives, wherein the channel estimator comprises a reduced complexity filter for deriving vectors of the estimated amplitudes and derivatives from vectors of received symbols and vectors of estimated symbols. The invention is based upon the recognition that the complexity of the channel estimator/filter can be substantially reduced without seriously affecting the ICI cancellation procedure.

In an embodiment of the transmission system according to the invention the reduced complexity filter is arranged for exploiting an amplitude correlation between the amplitudes of different subcarriers and/or for exploiting a derivative correlation between the derivatives of different subcarriers. Although the channel model is characterized by 2N parameters (with N being the number of subcarriers), the number of independent degrees of freedom is substantially smaller in practice. This property comes from the fact that the propagation delay spread is often much smaller than the word duration. This property also means that the entries in a vector of estimated amplitudes are strongly correlated, so that the covariance matrix $C_a$ of the amplitudes may be accurately approximated by a low-rank matrix. Similarly, the entries in a vector of derivatives are strongly correlated and the covariance matrix $C_d$ of the derivatives may also be accurately approximated by a low-rank matrix. Using these low-rank matrices in the channel estimator/filter results in a substantial reduction of the complexity.

In a further embodiment of the transmission system according to the invention the amplitude correlation and/or the derivative correlation are characterized by a N×N matrix C, with N being the number of subcarriers, wherein $C=U\Lambda U^H$, with U being the N×N unitary matrix of eigenvectors of C and Λ being the N×N positive diagonal matrix of the eigenvalues $\{\Lambda_1, \ldots, \Lambda_N\}$ of C, and wherein Λ is approximated by $\{\Lambda_1, \ldots, \Lambda_r, 0, \ldots 0\}$, with r<<N. The covariance matrices $C_a$ and $C_d$ depend on the matrix $C=U\Lambda U^H$. The sequence of eigenvalues $\{\Lambda_1, \ldots, \Lambda_N\}$ may be accurately approximated with a relatively small number r of non-zero values $\{\Lambda_1, \ldots, \Lambda_r, 0, \ldots 0\}$.

In a further embodiment of the transmission system according to the invention the reduced complexity filter comprises a multiplication by the N×N leakage matrix Ξ, wherein the multiplication is implemented by a combination of an N-point IFFT and an N pointwise multiplier. An additional complexity reduction is caused by the fact that the leakage matrix Ξ is diagonalized by a Fourier basis, i.e. that Ξ=FΔF$^H$, where F is the N-point FFT matrix with normalized columns and Δ is a positive diagonal matrix. Hence, a multiplication by the N×N matrix Ξ may be implemented by a combination of an N-point IFFT and N pointwise multiplications and an N-point FFT, thereby substantially reducing complexity.

Figure 2:
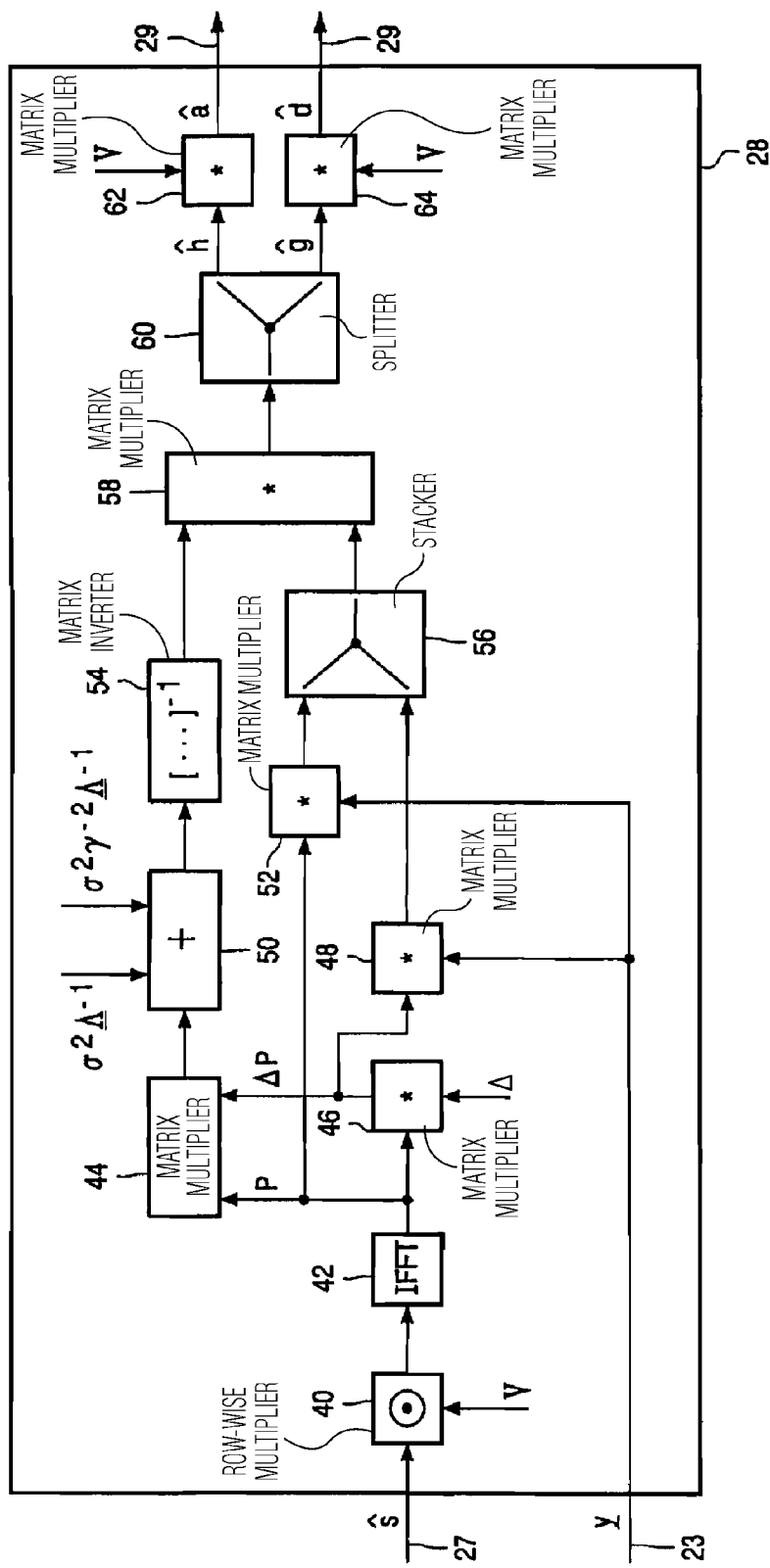

The above object and features of the present invention will be more apparent from the following description of the preferred embodiments with reference to the drawings, wherein:

FIG. 1 shows a block diagram of a transmission system according to the invention, FIG. 2 shows a block diagram of a channel response estimator/reduced complexity filter according to the invention.

The invention is based upon the development of a simple and reliable channel representation. Consider a multicarrier transmission system, e.g. an OFDM or MC-CDMA transmission system, with N subcarriers spaced by $f_s$. Each subcarrier has a rectangular envelope of a finite length that, including the cyclic extension, exceeds $(1/f_s)$. Let $s=[S_1, \ldots, S_N]^T$ be a vector of N transmitted symbols, then the transmitted continuous time baseband signal may be written as follows:

$$x(t) = \sum_{k=1}^{N} s_k \exp(i2\pi f_s kt). \quad (1)$$

In the case of a frequency selective time-varying additive white Gaussian noise (AWGN) channel, the received continuous time signal may be written as follows:

$$y(t) = \sum_{k=1}^{N} s_k H_k(t) \exp(i2\pi f_s kt) + n(t), \quad (2)$$

wherein the coefficient $H_k(t)$ represents the time-varying frequency response at the k-th subcarrier, for $1 \leq k \leq N$, and wherein n(t) is AGWN within the signal bandwidth. We assume that the channel slowly varies so that only a first order variation may be taken into account within a single data block duration. In other words, we assume that every $H_k(t)$ is accurately approximated by $$H_k(t) \approx H_k(t_r) + H'_k(t_r)(t-t_r), \quad (3)$$

wherein $H'_k(t)$ is the first order derivative of $H_k(t)$ and wherein $t_r$ is a reference time within the received data block. Note that the time varying channel $H_k(t)$ may also take into account a residual frequency offset, after the coarse frequency synchronization.

The received baseband signal is sampled with a sampling offset $t_o$ and a rate $Nf_s$ and a block of its N subsequent samples $[y(t_o), y(t_o+T), \ldots, y(t_o+(N-1)T)]$ $$\left(\text{with } T = \frac{1}{Nf_s}\right)$$

is subject to a fast fourier transform (FFT) of size N. Let $y=[y_1, \ldots, y_N]^T$ be the vector of N FFT samples so that $$y_k = \frac{1}{N} \sum_{n=0}^{N-1} y(t_o + nT) \exp(-i2\pi kn/N). \quad (4)$$

After substituting (2) into (4) and using the approximation (3), we obtain $$y_k = a_k s_k + \sum_{l=0}^{N-1} d_l s_l \sum_{n=0}^{N-1} (n/N) \exp(-i2\pi(k-l)n/N) + n_k, \quad (5)$$

$$a_l = \exp(i2\pi f_s lt_0)(H_l(t_r) + H'_l(t_r)(t_o - t_r)), \quad (6)$$

$$d_l = \exp(i2\pi f_s lt_0) T H'_l(t_r), \quad (7)$$

wherein $n_k$, for $1 \leq k \leq N$, are the samples of AWGN having a certain variance $\sigma^2$. It is convenient to rewrite the result (5) in a close matrix form. To this end, we define diagonal matrices A=diag $\{a_1, \ldots, a_N\}$, D=diag $\{d_1, \ldots, d_N\}$ and an N×N matrix $$\Xi = \{\Xi_{p,q}\}_{p,q=1}^{N}, \Xi_{p,q} = \sum_{n=0}^{N-1} (n/N) \exp(-i2\pi(p-q)n/N). \quad (8)$$

With this notation, the expression (5) is equivalent to $$y = As + \Xi Ds + n, \quad (9)$$

wherein $n=[n_1, \ldots, n_N]^T$ is an N×1 vector of AWGN. In the channel model (9), the effect of the channel is represented by two sets of N parameters $a=[a_1, \ldots, a_N]^T$ and $d=[d_1, \ldots, d_N]^T$. Check that $H_l(t_r) + H'_l(t_r)(t_o - t_r) \approx H_l(t_o)$, hence the coefficients $a_k$, for $1 \leq k \leq N$, are equal to the complex amplitudes of the channel frequency response rotated by the sampling phase $\exp(i2\pi f_s lt_0)$. Similarly, the coefficients $d_k$, for $1 \leq k \leq N$, are equal to the time-domain derivatives of the complex amplitudes of the channel frequency response scaled by the sampling period T and rotated by the same sampling phase $\exp(i2\pi f_s lt_0)$.

Note that an inter-carrier interference occurs when the channel response varies in time (i.e. d≠0). This interference is defined by the vector d as well as the fixed N×N matrix Ξ. It can be is easily seen that according to (8) the latter matrix is a Toeplitz Hermitian matrix and that $$\Xi = \{\Xi_{p,q}\}_{p,q=1}^{N}, \Xi_{p,q} = \begin{cases} (N-1)/2, & p=q; \\ -(1-e^{i2\pi(q-p)/N})^{-1}, & p \neq q. \end{cases}$$

Later in this document, we will call a the (vector of) amplitudes, d the (vector of) derivatives and Ξ the leakage matrix.

To process the received signal, the set of channel parameters a and d should be estimated. The estimation accuracy of these 2N scalar parameters may be enhanced if the statistical properties of the channel are used. First of all, we assume that channel variations are slow enough so that $H'_k(t)$ do not change substantially within the duration of a symbol. In this case, we may rewrite (6) and (7) as follows:

$$a_l \approx \exp(i2\pi f_s l t_o) H_l(t_o),\; d_l \approx \exp(i2\pi f_s l t_o) T H'_l(t_o), \quad 1 \leq l \leq N. \tag{10}$$

Let us analyze the relationship between the quantities a, d and physical parameters of the propagation channel, namely the set of its K propagation delays $\{\tau_0, \ldots, \tau_K\}$, the corresponding Doppler shifts $\{f_0, \ldots, f_K\}$, and complex amplitudes $\{h_0, \ldots, h_K\}$. Note that the statistical properties of the channel frequency response depend on the relative delays and Doppler shifts whereas the group delay and/or Doppler shift result in rotations of $h_k$, for $1 \leq k \leq K$; these rotations are handled by time and carrier synchronization/tracking. Hence, we may assume without loss of generality that $\tau_0 = 0$ and $f_0 = 0$. Now, the channel frequency response $H_l$ and its derivative $H'_l$ may be written as follows:

$$H_l(t) = \sum_{n=0}^{K} h_n \exp(i2\pi(f_n t - f_s l \tau_n)), \tag{11}$$

$$H'_l(t) = i2\pi \sum_{n=0}^{K} f_n h_n \exp(i2\pi(f_n t - f_s l \tau_n)),\; 1 \leq l \leq N.$$

The relationships (10) and (11) may be readily used to deduce the statistical properties of the amplitudes a and derivatives d. Whenever the number of propagation paths is big enough (ideally K>>N), the set of coefficients $\{H_l(t), H'_l(t)\}_{1 \leq l \leq N}$ may be considered jointly Gaussian distributed. Moreover, one can show that the sets $\{H_l(t)\}_{1 \leq l \leq N}$ and $\{H'_l(t)\}_{1 \leq l \leq N}$ are mutually uncorrelated when the sets $\{h_k\}_{1 \leq k \leq K}$ and $\{f_k\}_{1 \leq k \leq K}$ are statistically independent and the Doppler spectrum has a symmetric shape. In this case, the vectors a and d may be assumed statistically independent multivariate Gaussian with zero mean and covariance matrices $$E\{aa^H\} = C_a,\; E\{dd^H\} = C_d \tag{12}$$

where $E\{\cdot\}$ stands for the mathematical expectation operator and $C_a$, $C_d$ are N×N Hermitian non-negative definite matrices.

An important particular case of $C_a$ and $C_d$ corresponds to a standard model for mobile channels, as described in the book Microwave Mobile Communications by C. Jakes, John Wiley & Sons, Inc., 1974. This model (known as Jakes model) assumes independent contributions of different propagation paths, an exponential delay profile and uniformly distributed angles of incidence for different paths. One can show that in this case, $$C_a = C,\; C_d = \gamma^2 C,\; \gamma^2 = \frac{1}{2}(2\pi f_\Delta T)^2, \tag{13}$$

$$C_{pq} = \frac{1}{1 + i2\pi(p-q)f_s T_\Delta},\; 1 \leq p, q \leq N,$$

wherein $f_\Delta$ is the magnitude of the Doppler spread and wherein $T_\Delta$ is the root mean square propagation delay spread. The last two parameters depend on the mobile velocity and propagation environment respectively.

Although the outlined channel model is characterized by 2N parameters, the number of independent degrees of freedom is substantially smaller in practice. This property comes from the fact that the propagation delay spread is often much smaller than the word duration. This property also means that the entries of a are strongly correlated, to the extend that the covariance matrix $C_a$ may be accurately approximated by a low-rank matrix. Similarly, the entries of d are strongly correlated and the covariance matrix $C_d$ may also be accurately approximated by a low-rank matrix. Let us consider the Jakes model and therefore (13). Define the eigendecomposition of C:

$$C = U \Lambda U^H, \tag{14}$$

wherein U is the N×N unitary matrix of eigenvectors of C and wherein $\Lambda$ is the N×N positive diagonal matrix of its eigenvalues $\{\Lambda_1, \ldots, \Lambda_N\}$. Assume that the eigenvalues are ordered so that the sequence $\{\Lambda_1, \ldots, \Lambda_N\}$ is non-increasing. Under Jakes model, the elements of this sequence have an exponentially decaying profile:

$$\Lambda_k \sim \exp(-f_s T_\Delta k),\; \text{for } 1 \leq k \leq N. \tag{15}$$

Hence, the sequence of eigenvalues may be accurately approximated with a relatively small number r of non-zero values: $\{\Lambda_1, \ldots, \Lambda_N\} \approx \{\Lambda_1, \ldots, \Lambda_r, 0 \ldots 0\}$.

Our goal is to estimate the amplitudes a and the derivatives d from the received signals y. We will assume that the input symbols s are known. It is easy to see that the total number of amplitudes and derivatives is equal to 2N which is twice as large as the number of subcarriers. This yields an accurate approximation of the vectors a and d by r degrees of freedom only. In other words, we may write $$a \approx Vh,\; d \approx Vg, \tag{16}$$

where h and g are r×1 vectors that stack the free parameters corresponding to the amplitudes and the derivatives respectively whereas the N×r matrix V is built of the first r columns of U. With this approximation, a joint estimation of a and d becomes equivalent to a joint estimation of h and g. Hence the total number of free parameters becomes 2r instead of 2N. This observation has a crucial meaning taking into account that a relatively small r is sufficient in practice such that r<<N.

An additional complexity reduction is due to the fact that the leakage matrix $\Xi$ is diagonalized by a Fourier basis, i.e. that $$\Xi = F \Delta F^H, \tag{17}$$

where F is the N-point FFT matrix with normalized columns and $\Delta$ is a positive diagonal matrix. The aforementioned property of the matrix $\Xi$ follows directly from (8). Check that the diagonal values of $\Delta$ are given by the integers $\{0, 1, 2, \ldots, N-1\}$. Hence, a multiplication by the N×N matrix $\Xi$ may be implemented by a combination of N-point FFT (IFFT) and N pointwise multiplications, thereby substantially reducing complexity.

The approximation (16), together with the expression (17) lead to an optimal least square estimation procedure which is derived in the following paragraphs.

Let us rewrite expression (9) so as to concentrate the channel parameters in two N×1 vectors: a for the amplitudes and d for the derivatives:

$$y = Sa + \Xi Sd + n, \tag{18}$$

where S is the N×N diagonal matrix with the values $\hat{s}_1, \ldots, \hat{s}_N$ on its diagonal. To make use of a finite order channel approximation, we will substitute (16) into (18). Furthermore, we also substitute (17) into (18), in order to take into account the structure of the leakage matrix Ξ. The result of the two substitutions is as follows:

$$y = SVh + F\Delta F^H SVg + n, \quad (19)$$

A computationally attractive variant of (19) may be obtained by moving from the frequency domain to the time domain. Namely, the N×1 vector $\underline{y} = F^H y$ is the IFFT of the vector of subcarriers, therefore it stands for the received signal in the time domain (up to a normalization). Similarly, we define the N×1 vector of noise $\underline{n}$ in the time domain. Recall that the noise is AWGN of power $\sigma^2$ in time as well as in the frequency domain.

After applying the IFFT to (19), we obtain $$\underline{y} = Ph + \Delta Pg + \underline{n}, \text{ where } P = F^H SV, \underline{n} = F^H n. \quad (20)$$

Here P is an N×r matrix. To derive the approximate MMSE estimate, we note that, according to (12), (13) and (14) and given an approximation order r, the covariance matrices of h and g (as defined in (16)) satisfy $$E\{hh^H\} = \Lambda, \; E\{gg^H\} = \gamma^2 \Lambda, \quad (21)$$

where Λ is the r×r diagonal matrix with the diagonal values $\{\Lambda_1, \ldots, \Lambda_r\}$. Given the data model (20)–(21), the MMSE estimator of the parameters h and g yields the estimates $\hat{h}$ and $\hat{g}$ obtained by minimizing $$\sigma^{-2} \left\| \underline{y} - [P, \Delta P]\begin{bmatrix} h \\ g \end{bmatrix} \right\|^2 + \begin{bmatrix} h \\ g \end{bmatrix}^H \begin{bmatrix} \Lambda^{-1} & 0 \\ 0 & \gamma^{-2}\Lambda^{-1} \end{bmatrix} \begin{bmatrix} h \\ g \end{bmatrix}, \quad (22)$$

over {h,g}. The aforementioned problem permits an explicit solution given by the following expression:

$$\begin{bmatrix} \hat{h} \\ \hat{g} \end{bmatrix} = \begin{bmatrix} \sigma^2 \Lambda^{-1} + P^H P & P^H \Delta P \\ P^H \Delta P & \sigma^2 \gamma^{-2} \Lambda^{-1} + P^H \Delta^2 P \end{bmatrix}^{-1} \begin{bmatrix} P^H \\ P^H \Delta \end{bmatrix} \underline{y} \quad (23)$$

Finally, the empirical vectors of amplitudes and derivatives are computed, according to (16), via $$\hat{a} = V\hat{h}, \; \hat{d} = V\hat{g}. \quad (24)$$

The algorithm summarized in (23) and (24) is schematically presented in FIG. 2. Recall that Δ is diagonal matrix, i.e. applying this matrix to a vector yields N multiplications only. Hence, for moderate r, the main computational effort is related with computing $P^H P$, $P^H \Delta P$ and $P^H \Delta^2 P$.

FIG. 1 shows a block diagram of a transmission system according to the invention. The transmission system comprises a transmitter 10 and a receiver 20. The transmission system may comprise further transmitters 10 and receivers 20. The transmitter 10 transmits a multicarrier signal via a wireless channel to the receiver 20. The multicarrier signal may be an OFDM signal or a MC-CDMA signal. The receiver 20 comprises a demodulator 22 for demodulating the received multicarrier signal 23, which received multicarrier signal 23 comprises vectors of received symbols 23. The demodulator 22 may be implemented by means of a FFT. The demodulated multicarrier signal is supplied by the demodulator 22 to an equalizer 24. The equalizer 24 cancels intercarrier interference which may be included in the received multicarrier signal. The equalizer 24 outputs vectors of estimated symbols 25 (which have been derived from the vectors of received symbols) to a (soft) slicer 26. The slicer 26 produces soft metrics (soft decisions) and/or binary estimates (hard decisions) of the (coded) bits to be used in the further signal processing parts of the receiver (which are not shown), e.g. a FEC decoder. The output signal of the slicer 26 may also be regarded as comprising estimated symbols 27. The receiver 20 further comprises a channel estimator 28 for estimating amplitudes 29 of the subcarriers and for estimating time derivatives 29 of the amplitudes. The equalizer 24 cancels the intercarrier interference included in the received (demodulated) multicarrier signal in dependence on the estimated amplitudes and derivatives 29 which are supplied by the channel estimator 28 to the equalizer 24. The channel estimator 28 comprises a reduced complexity filter for deriving vectors of the estimated amplitudes and derivatives 29 from the vectors of received symbols 23 and vectors of estimated symbols 27.

The estimator 28 is described by equations (23)–(24); its block-diagram is shown in FIG. 2. Vector components of a vector of N estimated symbols 27 multiply N rows of the N×r matrix V in a row-wise multiplier 40. The r columns of the resulting N×r matrix undergo an IFFT 42. The resulting N×r matrix P is supplied to a matrix multiplier 46, to a matrix multiplier 44 and to a matrix multiplier 52. The matrix multiplier 46 computes the product ΔP which is a row-wise multiplication of the N×r matrix P by N diagonal entries of Δ. The resulting N×r matrix is supplied to a matrix multiplier 48. In this matrix multiplier 48 the r×N Hermitian conjugate $P^H$ Δ of the output of matrix multiplier 46 is multiplied by a N×1 vector of received signals 23. The output signal of the matrix multiplier 48 is supplied to a first input of a stacker 56.

In the matrix multiplier 44 the products $P^H P$, $P^H \Delta P$ and $P^H \Delta^2 P$ are computed from the outputs P and ΔP of the IFFT 42 and the matrix multiplier 46 respectively. The quantities $\sigma^2 \Lambda^{-1}$ and $\sigma^2 \gamma^{-2} \Lambda^{-1}$ are added to the blocks $P^H P$ and $P^H \Delta^2 P$ respectively in a matrix adder 50. The output signal of the matrix adder 50 is a 2r×2r matrix that appears in the equation (23). This matrix is inverted in a matrix inverter 54 and the resulting inverted matrix is supplied to a matrix multiplier 58.

In the matrix multiplier 52 the r×N Hermitian conjugate $P^H$ of the output of The IFFT 42 is multiplied by the N×1 vector of received signals 23. The resulting signal is supplied to a second input of the stacker 56. The stacker 56 stacks the signals which are supplied to its first r×1 and second r×1 input vector and the stacked 2r×1 vector is thereafter supplied to the matrix multiplier 58 which multiplies it with the 2r×2r inverted matrix. The output 2r×1 signal of the matrix multiplier 58 is next supplied to a splitter 60 which splits it into two r×1 vectors. Each of these two vectors is thereafter multiplied by a matrix V in the matrix multipliers 62 and 64. The resulting output r×1 vectors are the estimated amplitudes and derivatives 29.

The proposed channel estimator uses the N×1 vector $\underline{y}$ of received symbols in the time domain (i.e. before OFDM demodulation) and the N×1 vector $\hat{s}$ of the transmitted symbols or their estimates. The algorithm also makes use of the channel statistics represented by V and Λ as well as leakage matrix properties that are concentrated in Δ. Note that these three quantities may be precomputed.

Let us briefly analyze the complexity of the proposed procedure. The most computationally extensive blocks of the scheme are the matrix multiplier 44 and the matrix inverter 54. The matrix multiplier 44 computes a 2r×2r matrix built of auto- and cross-products of two N×r matrices (e.g. $P^H P$, $P^H \Delta P$ and $P^H \Delta^2 P$). These operations require $3r(r+1)N/2$ complex-valued multiplications. The matrix inverter 54 inverts a 2r×2r matrix, which yields approximately $\frac{2}{3}(2r)^3 = 16r^3/3$ complex multiplications. Hence, the overall complexity grows only linearly along with the number N of subcarriers. The last feature is particularly attractive for DVB-T where N ranges from 2048 in the 2K-mode to 8192 in 8K-mode.

Simulations have shown that the proposed estimation of a and d yields a loss of approximately 1.5 dB when r=5 compared to the situation in which the channel parameters are known. The loss becomes negligible at r=10.

The proposed channel response estimation algorithm relies upon the knowledge of the whole set of input symbols for at least one OFDM block. The application of the algorithm becomes straightforward when s is known to the receiver (i.e. during the training phase). During the data transmission phase, the following ways to obtain the reference signal may be considered:

(A) Fast channel variations: in this scenario, the channel coherence time is supposed to be smaller or comparable to the time delay between adjacent OFDM blocks. In this case, we assume that a channel estimate corresponding to a given block can not be reused during the following block in a satisfactory way, i.e. so that a required low level BER is preserved. We may suggest either to use the estimate from the previous block and along with the simplified MMSE solution or to apply the conventional OFDM processing in order to obtain the estimate ŝ of the transmitted symbols. This estimate is subsequently used to refresh the channel estimate. Although the input symbols ŝ are detected with some errors, the impact of these errors on the estimation accuracy is not very important. Indeed, these errors will result in an equivalent additive noise with an average power that is comparable to the power of the observation noise. The impact of this additional noise on the estimation accuracy is alleviated by the fact that the number N of observation samples is substantially bigger than the number 2r of free parameters to be estimated.

(B) Slow channel variations: in this case we assume that the channel coherence time is substantially bigger than the time delay between the adjacent OFDM blocks. Therefore, the channel estimate from the current OFDM block may be reused for a number of the following blocks. In this case, the channel estimate is periodically computed according to the defined procedure. This estimate makes use of the detected data corresponding to the current OFDM block and may be exploited for the following OFDM blocks. The periodicity of estimation is defined by the channel coherence time. This scheme enables a relatively cheap real time implementation since a processing delay equal to the duration of several consecutive OFDM blocks is possible.

In the described estimation procedure, a single OFDM block is used for the channel estimation. Although a single block enables rather good estimation accuracy in DVB-T (owing to the fact that the number of subcarriers is much bigger than the number of free channel parameters in both 2K and 8K mode), the use of multiple OFDM blocks may be also considered. The extension to the case of multiple blocks is rather straightforward: it consists of stacking a number of matrices P computed from the corresponding OFDM blocks. The rest of the procedure remains unaltered. The corresponding increase in the computation complexity is linear with respect to the number of blocks involved.

Although in the above mainly an OFDM transmission system is described, the invention is also and equally well applicable to other multicarrier transmission systems such as MC-CDMA transmission systems. The reduced complexity filter may be implemented by means of digital hardware or by means of software which is executed by a digital signal processor or by a general purpose microprocessor.

The scope of the invention is not limited to the embodiments explicitly disclosed. The invention is embodied in each new characteristic and each combination of characteristics. Any reference sign do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A transmission system for transmitting a multicarrier signal from a transmitter to a receiver, the multicarrier signal comprising a plurality of subcarriers, the receiver comprising a channel estimator for estimating amplitudes of the subcarriers and for estimating time derivatives of the amplitudes, the receiver further comprising an equalizer for canceling intercarrier interference included in the received multicarrier signal in dependence on the estimated amplitudes and derivatives, wherein the channel estimator comprises a filter comprising a multiplication by an N×N leakage matrix $\Xi$ for deriving vectors of the estimated amplitudes and derivatives from vectors of received symbols and vectors of estimated symbols.

2. The transmission system according to claim 1, wherein the filter is arranged for exploiting an amplitude correlation between the amplitudes of different subcarriers and/or for exploiting a derivative correlation between the derivatives of different subcarriers.

3. The transmission system according to claim 2, wherein the amplitude correlation and/or the derivative correlation are characterized by a N×N matrix C, with N being the number of subcarriers, wherein $C = U \Lambda U^H$, with U being the N×N unitary matrix of eigenvectors of C and $\Lambda$ being the N×N positive diagonal matrix of the eigenvalues $\{\Lambda_1, \ldots, \Lambda_N\}$ of $C_1$, and wherein $\Lambda$ is approximated by $\{\Lambda_1, \ldots, \Lambda_r, 0, \ldots 0\}$, with r<<N.

4. The transmission system according to claim 2, wherein the multiplication is implemented by a combination of an N-point IFFT and an N pointwise multiplier.

5. A receiver for receiving a multicarrier signal from a transmitter, the multicarrier signal comprising a plurality of subcarriers, the receiver comprising a channel estimator for estimating amplitudes of the subcarriers and for estimating time derivatives of the amplitudes, the receiver further comprising an equalizer for canceling intercarrier interference included in the received multicarrier signal in dependence on the estimated amplitudes and derivatives, wherein the channel estimator comprises a filter comprising a multiplication by an N×N leakage matrix $\Xi$ for deriving vectors of the estimated amplitudes and derivatives from vectors of received symbols and vectors of estimated symbols.

6. The receiver according to claim 5, wherein the filter is arranged for exploiting an amplitude correlation between the amplitudes of different subcarriers and/or for exploiting a derivative correlation between the derivatives of different subcarriers.

7. The receiver according to claim 6, wherein the amplitude correlation and/or the derivative correlation are characterized by a N×N matrix C, with N being the number of subcarriers, wherein $C=UAU^H$, with U being the N×N unitary matrix of eigenvectors of C and A being the N×N positive diagonal matrix of the eigenvalues $\{A_1, \ldots, A_N\}$ of C, and wherein A is approximated by $\{A_1, \ldots, A_r, 0, \ldots 0\}$, with r<<N.

8. The receiver according to claim 6, wherein the multiplication is implemented by a combination of an N-point IFFT and an N pointwise multiplier.

9. A channel estimator for estimating amplitudes of subcarriers included in a multicarrier signal and for estimating time derivatives of the amplitudes, the channel estimator comprising a filter comprising a multiplication by an N×N leakage matrix $\Xi$ for deriving vectors of the estimated amplitudes and derivatives from vectors of received symbols and vectors of estimated symbols.

10. The channel estimator according to claim 9, wherein the filter is arranged for exploiting an amplitude correlation between the amplitudes of different subcarriers and/or for exploiting a derivative correlation between the derivatives of different subcarriers.

11. The channel estimator according to claim 10, wherein the amplitude correlation and/or the derivative correlation are characterized by a N×N matrix C, with N being the number of subcarriers, wherein $C=UAU^H$, with U being the N×N unitary matrix of eigenvectors of C and A being the N×N positive diagonal matrix of the eigenvalues $\{A_1, \ldots, A_N\}$ of $C_1$, and wherein A is approximated by $\{A_1, \ldots, A_r, 0, \ldots 0\}$, with r<<N.

12. The channel estimator according to claim 10, wherein the multiplication is implemented by a combination of an N-point IFFT and an N pointwise multiplier.

13. A method of estimating amplitudes of subcarriers included in a multicarrier signal and for estimating time derivatives of the amplitudes, the method comprising filtering vectors of received symbols and vectors of estimated symbols with a filter comprising a multiplication by an N×N leakage matrix $\Xi$, in order to derive vectors of the estimated amplitudes and derivatives.

14. The method according to claim 13, wherein the filter is arranged for exploiting an amplitude correlation between the amplitudes of different subcarriers and/or for exploiting a derivative correlation between the derivatives of different subcarriers.

15. The method according to claim 14, wherein the amplitude correlation and/or the derivative correlation are characterized by a N×N matrix C, with N being the number of subcarriers, wherein $C=UAU^H$, with U being the N×N unitary matrix of eigenvectors of C and A being the N×N positive diagonal matrix of the eigenvalues $\{A_1, \ldots, A_N\}$ of $C_1$, and wherein A is approximated by $\{A_1, \ldots, A_r, 0, \ldots 0\}$, with r<<N.

16. The method according to claim 14, wherein the multiplication is implemented by a combination of an N-point IFFT and an N pointwise multiplier.

* * * * *